UNITED STATES PATENT OFFICE.

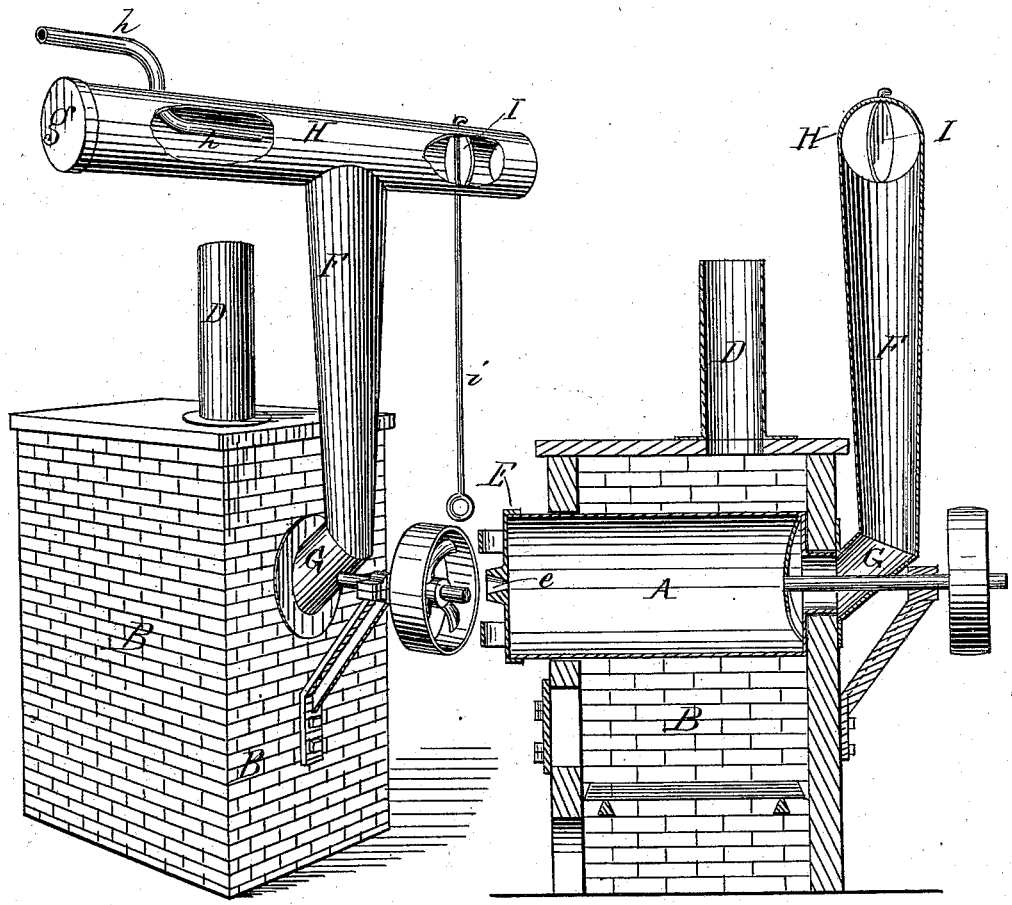

WILLIAM T. BOWN AND SAMUEL E. BOWN, OF PITTSBURG, PENNSYLVANIA.

IMPROVEMENT IN COFFEE ROASTER AND PURIFIER.

Specification forming part of Letters Patent No. 217,258, dated July 8, 1879; application filed February 1, 1879.

*To all whom it may concern:*

Be it known that we, WILLIAM T. BOWN and SAMUEL E. BOWN, of the city of Pittsburg, in the county of Allegheny and State of Pennsylvania, have invented a new and useful Apparatus for Removing Dust, Dirt, Smoke, and Steam from Coffee during the Process of Roasting, which invention is fully described in the following specification and accompanying drawings.

Our invention relates to the removal of dust, dirt, smoke, and steam from coffee when in the process of roasting in revolving cylinders in furnaces.

Heretofore in roasting coffee the only outlet for the dust, dirt, smoke, and steam has been by means of a pipe extending into a chimney. This arrangement, however, is found to be deficient in power to draw the dust, dirt, &c., from the cylinder.

In the process of roasting coffee the cylinder is exposed to a bright fire in the furnace, and as the coffee heats its moisture is converted into steam, which contains deleterious properties. It next expands, thereby parting with its hull, and as the roasting is continued a large quantity of smoke is produced by the burning of substances mixed with the coffee, and when the roasting process is almost completed the beans slightly open, emitting a fine dust from between their leaves. This dust, together with the hulls, charred twigs, and other dirt, are pulverized by the movement of the coffee in the cylinder as it revolves, and when the cooling-water or glazing-mixture is introduced into the cylinder this pulverized dirt is converted into a paste and adheres to the coffee, imparting unhealthy properties and impairing its flavor.

The object of our invention is to clean the coffee of all substances lighter than the coffee, and to remove the hulls and dust as soon as emitted, also to withdraw the smoke and steam as they are evolved.

The invention consists in a tapering vertical pipe, the small end being down and loosely connected to the cylinder, the upper end opening into a large horizontal pipe, which is connected with an exhaust device or fan, said device having its discharge-pipe opening into a closed room; in providing a valve or damper in the horizontal pipe for regulating the power of the fan; also, means for cleaning said horizontal pipe.

The invention is illustrated in detail in the drawings, in which all similar letters of reference indicate like parts.

Figure 1 is a perspective view of the invention, taken at the rear of the cylinder, to which it is applied. Fig. 2 is a longitudinal vertical section of the same, showing the tapering pipe opening into the cylinder and the horizontal pipe, said horizontal pipe being in cross-section.

A is the usual roasting-cylinder; B, the furnace; D, the furnace smoke-pipe; e, the funnel-tube, all of which are constructed, arranged, and operated in the usual way. F is the vertical pipe, loosely attached to the cylinder at its rear end, so as to cover an opening in the center thereof.

G is the elbow, or that part of the pipe F which is bent from the vertical so as to make said connection. From this elbow the pipe F gradually increases in diameter, being about five inches at its lower and seven inches at its upper end, the length of the pipe being not less than four feet. Its upper end opens into and connects with the large horizontal pipe H, which extends to and connects with the inlet of an exhaust-fan, so that suction may be produced through said pipes on the cylinder. *g* is a cap on the rear end of pipe H, which can be removed for the purpose of cleaning it. *h* is a small steam-pipe, the mouth of which opens into pipe H near its rear end, and is connected with a steam-boiler and provided with an ordinary globe-valve. (Not shown.) I is a damper or valve located in the horizontal pipe H, between the fan and mouth of pipe F. *i* is its shaft, extending down so as to be within reach when it is desired to adjust the damper in order to regulate the power or suction of the fan on the cylinder.

It will be understood that a continuous passage-way is formed from the interior of the roasting-cylinder to the exhaust device or fan, and that the horizontal pipe may be connected with several cylinders by a series of vertical pipes, as described.

The operation of the invention is as follows: The cylinder A, having been charged with coffee, is revolved in the usual way. The fan being in operation produces a suction through the pipes H F G on the interior of the cylinder, so that the steam and smoke are drawn out as fast as produced, and also all foreign substances lighter than the coffee-beans, as well as the hulls and coffee-dust emitted when the bean opens, and thus the coffee is freed from all this dust and dirt.

When the roasting process is completed the damper is partly closed, so as to decrease the power of the fan. The cooling-water is then introduced into the cylinder. This produces a large volume of steam, which would, if the exhaust were full force, drive the coffee into the pipe H, but of itself is not powerful enough so to do, and, at most, only a small portion will be forced a short distance up the vertical pipe F; but, as it is larger at its upper end, the coffee separates and the steam escapes between the beans, and they drop back into the cylinder.

We desire to say that if, in practice, the vertical pipe cannot be made at least four feet in height, by reason of the lowness of the ceiling, the major diameter of the vertical pipe should be increased in proportion, and that in this case the damper should be only one-third open. The horizontal pipe H will at times have to be cleaned by removing the cap $g$ and brushing it out, then blowing steam through it.

Having thus described our invention and its operation, what we claim, and desire Letters Patent for, is—

1. A coffee-roasting cylinder provided with a vertical funnel-shaped pipe and a horizontal pipe adapted, in the manner described, to open into an exhaust-fan, as and for the object set forth.

2. In combination with a coffee-roasting apparatus, a vertical pipe and a horizontal pipe adapted, in the manner described, to connect with an exhaust-fan, all arranged and operating as and for the object set forth.

3. The damper I, as described, in combination with pipes H and F, operating to regulate the power of an exhaust-fan, said fan being connected with a coffee-roasting apparatus through the pipes aforesaid, as and for the object set forth.

4. The funnel-shaped pipe F, elbow G, and pipe H, all combined, arranged, and operating to form a passage-way between an exhaust device and a coffee-roasting apparatus, as and for the object set forth.

5. The removable cap $g$ and steam-pipe $h$, as described, in combination with and for the purpose of cleaning the horizontal pipe H.

WILLIAM T. BOWN.
SAMUEL E. BOWN.

In presence of—
Wm. M. Cuthbert,
B. McKenna.